Oct. 19, 1937.  C. C. FARMER  2,096,484
BYPASS VALVE FOR DIRT COLLECTORS
Filed Nov. 30, 1934
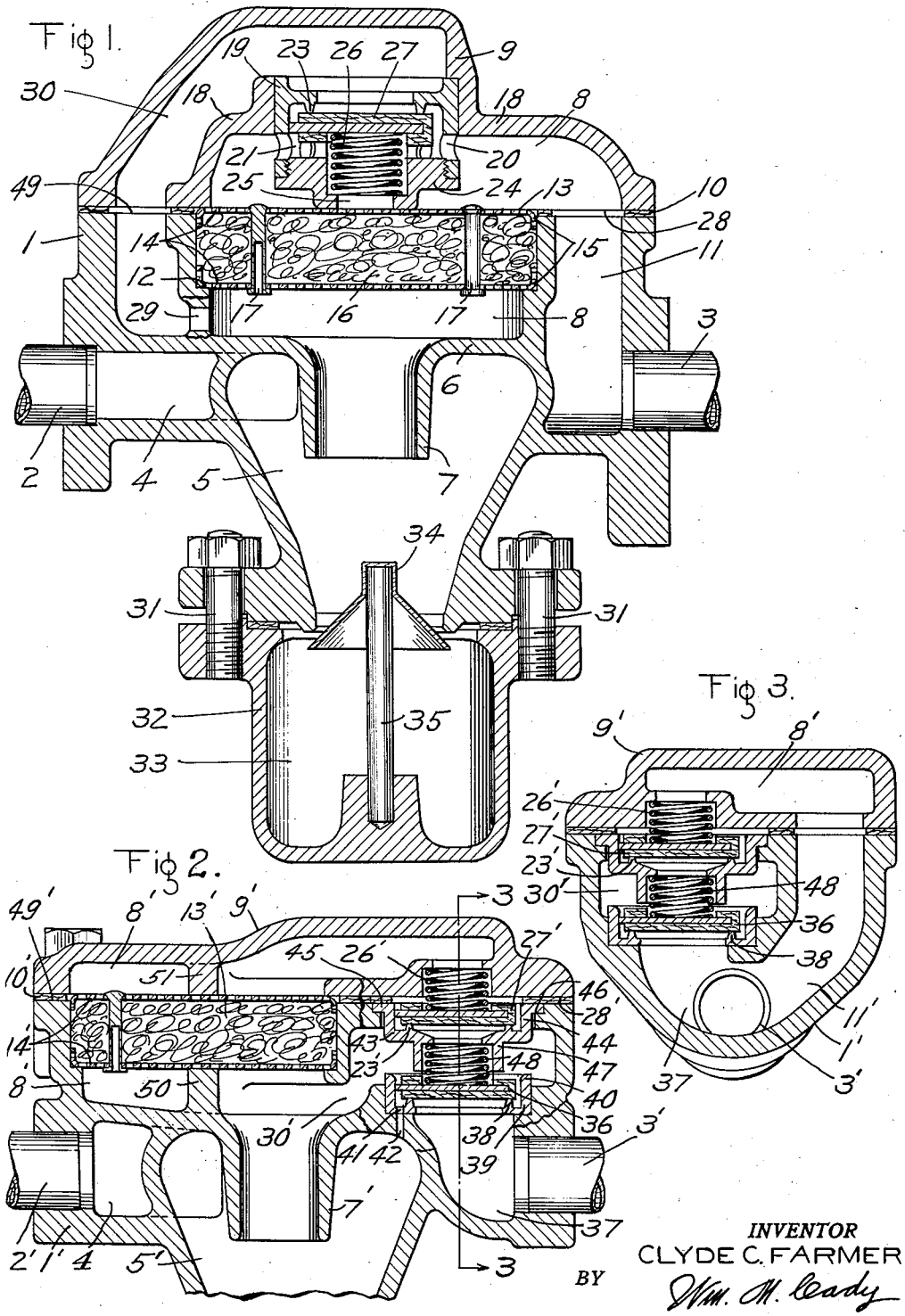
INVENTOR
CLYDE C. FARMER
BY Wm. M. Cady
ATTORNEY Patented Oct. 19, 1937

2,096,484

UNITED STATES PATENT OFFICE 2,096,484

BYPASS VALVE FOR DIRT COLLECTORS

Clyde C. Farmer, Pittsburgh, Pa., assignor to The Westinghouse Air Brake Company, Wilmerding, Pa., a corporation of Pennsylvania Application November 30, 1934, Serial No. 755,313

8 Claims. (Cl. 183—39)

This invention relates to dirt collectors for fluid pressure systems, such as a fluid pressure brake system, and has for its object to provide a centrifugal dirt collector having associated therewith a removable air filter or strainer adapted to remove from the fluid supplied to the brake system, foreign matter which is too fine and light to be caught by the centrifugal dirt collector, and having means adapted to automatically permit fluid to flow through the centrifugal dirt collector without passing through the strainer in the event that said strainer becomes so clogged with foreign matter as to prevent the free passage therethrough of the fluid to be cleaned.

In the accompanying drawing; Fig. 1 is a sectional view of a centrifugal dirt collector embodying the invention, including a single valve arranged in a by-pass connection around the strainer element for permitting the flow of fluid under pressure in one direction through the dirt collector without traversing the strainer element; Fig. 2 is a fragmentary sectional view of a centrifugal dirt collector embodying the invention, including two valves, each arranged in a by-pass connection around the strainer element for permitting flow of fluid under pressure in opposite directions through the dirt collector without traversing the strainer element; and Fig. 3 is a fragmentary sectional view taken on the line 3—3 of Fig. 2.

As shown in Fig. 1, the dirt collector is of the well known centrifugal type and comprises a casing section 1 which is interposed between the sections 2 and 3 of the fluid conducting pipe in such a manner that fluid under pressure enters the casing through the pipe section 2 and flows out through the pipe section 3, the pipe 2 being connected through a supply passage 4 with a conical dirt separating chamber 5.

The upper end of the dirt separating chamber is defined by a partition wall 6 provided with a tubular portion 7 extending downwardly a short distance into said chamber. Said tubular portion establishes a constantly open communication or outlet passage between the chamber 5 and a chamber 8 provided in the casing.

The upper end of the chamber 8 is defined by a cap section 9 which may be secured to the casing section 1 by means of bolts (not shown), a gasket 10 being clamped between the surfaces 28 and 49 of said cap section and casing, respectively. The portion of chamber 8 formed in the cap section is open through a discharge passage 11 in the casing to the pipe section 3.

Contained in the chamber 8 and disposed in spaced relation with the wall 6 and a wall 18 of the cap section 9, and clamped between an annular shoulder 12 of the casing 1 and the surface 28 of the cap section 9, is a strainer element 13 which is normally adapted to permit the flow of fluid under pressure therethrough from the portion of the chamber 8 below the strainer element to the portion of said chamber above the strainer element and thence through the passage 11 to the outlet pipe 3.

The strainer element 13 comprises a pair of spaced foraminous members 14 preferably formed of sheet metal or wire mesh and provided with inwardly extending vertically disposed flanges 15, the space intermediate said members being filled with suitable resilient strainer material 16, such as curled hair. The strainer members 14 are held together against separation by means of the rivets 17, so that the strainer material is held confined between said members. It will be understood that the rivets do not prevent the members 14 from being moved toward each other. By reason of this construction, the strainer element will adapt itself to the depth of the space provided for it, regardless of manufacturing variations.

Carried by the wall 18 of the cap section 9 is a valve cage which may comprise a valve seat member 19 pressed into a suitable bore in said wall above the strainer element 13, preferably in axial alignment therewith, and having, on its lower side, an annular valve seat rib 23 surrounded by an annular flange which extends downwardly into chamber 8 in the cap section 9, the extended portion of said flange being provided with a plurality of openings 20 which open into said chamber 8 and through which fluid under pressure is adapted to flow.

The flange of the valve seat member 19 defines a chamber 21 and contained in said chamber is a valve 27 adapted to seat on the seat rib 23. A cap nut 24 is screw-threaded into the lower end of said flange and has a relatively large opening 25 provided through the end thereof to permit fluid to flow therethrough, as will be understood from the description hereinafter. Interposed between the cap nut and engaging an inner surface of the cap nut and the valve is a coil spring 26, the pressure of which tends to urge the valve 27 to its seat on the seat rib 23.

It will be seen from Fig. 1 that the lower end surface of the cap nut 24 is substantially flush with the surface 28 of the cap section 9, so that when the parts are assembled as shown, the end of the cap nut will engage the central portion of the upper strainer member 14 of the strainer element 13, or may even be spaced a very slight distance away from the central portion of said member, for a purpose which will presently appear.

The portion of the chamber 8 below the strainer element 13 is in communication through a passage 29 with a passage 30 which leads to the upper, or seated, side of the valve 27.

Secured to the casing section 1 by bolts 31 is a casing section 32 having a dirt collecting chamber 33, connection between the chamber 5 and chamber 33 being controlled by a valve member 34, which is mounted on a stem 35 secured to the casing 32.

In operation, fluid under pressure supplied to the pipe 2 flows therefrom through the supply passage 4 into the dirt separating chamber 5, from whence it flows through the outlet passage formed in the tubular portion 7 into the portion of chamber 8 disposed below the strainer element 13, then through said strainer element into the portion of chamber 8 disposed above the strainer element, and from thence through the discharge passage 11 to the pipe 3. Any foreign matter which may be present in the fluid supplied to the centrifugal dirt collector and which may be too fine and light to be separated therefrom by the well known action of the dirt collector will be caught by the curled hair 16 of the strainer element 13. The valve 27 will remain seated, being pressed to its seat by the spring 26.

It will be understood that the cap nut 24, even if it does engage the upper strainer member 14, will not impede the flow of fluid through the strainer element to any appreciable extent because the relatively large opening 25 in said cap nut, which opens into chamber 8 above the strainer element through chamber 21 and the openings 20, permits a rapid flow therethrough of fluid supplied through that portion of the strainer element directly below it.

If the curled hair 16 of the strainer element 13 should become so clogged with foreign matter as to offer substantial resistance to the flow of fluid, then the pressure of fluid in chamber 8 below the strainer element and acting through passages 29 and 30 on the seated face of the valve 27 will exceed the combined pressures of fluid supplied through the strainer element 13 to chamber 8 above said strainer element and that of spring 26, so that the valve 27 will be unseated from the seat rib 23 and will then permit the flow of fluid from passage 30 to the pipe 3 past the valve 27, then through chamber 21, openings 20, chamber 8 above the strainer element 13 and the discharge passage 11.

As the strainer element becomes clogged with foreign matter, the pressure differential acting on said strainer increases and would tend to buckle the strainer element in an upward direction sufficiently to pull its outer edge from the space between the surface 28 of the cap section 9 and the shoulder 12 of the casing section 1 were it not for the cap nut 24. Said cap nut, by normally engaging the central portion of the upper strainer member 14, or being spaced such a slight distance therefrom that the cap nut will be engaged by said strainer plate upon slight buckling of the strainer element 13 in an upward direction, supports said strainer element and prevents it from being buckled to such an extent as to free its outer edge, and thereby insures that the strainer element will remain in the position intended.

Moisture caught by the strainer element 13 will drain therefrom, when the flow of fluid under pressure ceases, through the tubular portion 7 into the dirt separating chamber 5 and thence into the dirt collecting chamber 33.

Since, in the event of a clogged strainer element, fluid under pressure is adapted to flow in only one direction through the centrifugal dirt collector shown in Fig. 1, it will be understood that the use of said dirt collector is limited to installations in which only a one-way flow of fluid is required, such for instance, as in the pipe through which fluid under pressure is supplied from the main reservoir to the application portion of the well known distributing valve device commonly employed in locomotive fluid pressure brake systems.

The centrifugal dirt collector shown in Fig. 2 is for use where a two-way flow of fluid is required, such, for instance, as in the brake pipe branch pipe leading to the triple valve device commonly employed in fluid pressure brake systems, and is similar to the centrifugal dirt collector illustrated in Fig. 1 except that a multiple valve construction is embodied therein which permits flow of fluid under pressure in opposite directions through the dirt collector in case the normal flow through the strainer element should fail by reason of the clogging of said element with foreign matter.

According to the construction shown in Figs. 2 and 3, a check valve 36 is provided which controls communication from the discharge passage 37, which is a branch of passage 11', to chamber 8' below the strainer element 13' by way of passage 30'. The check valve 36 is adapted to seat on an annular seat rib 38 provided on the inner surface of an inwardly extending annular flange 39 formed at the lower end of a bushing 40 preferably pressed into a suitable bore in the casing section 1'. Thus, the valve seat rib 38 is surrounded by the wall of the bushing 40, and said wall is extended upwardly beyond the valve seat rib 38 so as to prevent excessive transverse movement of the check valve 36. An opening 41 is provided in the flange 39 in the annular space between the inner wall of the bushing and the seat rib 38 which registers with a passage 42 provided in the casing section 1 and leading to the dirt separating chamber 5', so as to permit moisture which may collect in said space to drain into said chamber.

The valve 27' controls communication from chamber 8' below the strainer element 13' to chamber 8' above said strainer element by way of passage 30'. The valve 27' is adapted to seat on the seat rib 23' provided on a valve seat member 43 having on its upper side a cylindrical flange 44 for guiding said check valve, said flange being provided with an outwardly extending annular lug 45 adapted to be supported on a shoulder 46 formed at the upper end of the casing section 1', the outer face of said lug being substantially flush with the surface 49' of the casing section 1'.

The lower side of the valve seat member 43 is provided with a cylindrical flange 47, which extends toward the valve 36 and which serves to limit the movement of said valve away from the seat rib 38, and to center a spring 48 interposed between and engaging the valve 36 and the valve seat member 43 for urging said valve into engagement with said seat rib. With the cap section 9' and gasket 10' secured to the casing section 1', the lug 45 is clamped against the shoulder 46 so as to hold the valve seat member 43 in its proper position against movement relative to the casing section 1'. The spring 26' interposed between the cap section 9' and the check valve 27' acts to urge said valve to its seat on the seat rib 23'.

In the construction shown in Fig. 2, the strainer element 13' and the chamber 8' therebelow are not disposed centrally over the tubular portion 7'. To facilitate drainage into the dirt separating chamber 5' of moisture which may collect in said chamber 8', the floor of said chamber is inclined toward said tubular portion.

A lug 50 projecting upwardly from the floor of chamber 8' below the strainer element 13' is adapted to engage the central portion of the lower strainer member 14' so as to support the strainer element against buckling in a downward direction in the event that the strainer element becomes so clogged with foreign matter that a substantial pressure differential, acting downwardly, is established on the strainer element, and a lug 51 depending from the wall of the cap section 9' is adapted to engage the central portion of the upper strainer member 14' and support the strainer element 13' against buckling in an upward direction in the event that a substantial differential, acting upwardly, is established across said strainer element.

Assuming that fluid under pressure is supplied through pipe 2' to the dirt collector shown in Fig. 2, and the strainer element 13' is clogged with foreign matter, so as to retard the flow of fluid therethrough, such that the fluid pressure in passage 30' acting on the seated area of the valve 27' exceeds the pressure in chamber 8' above said valve sufficiently to overcome the pressure of spring 26', the valve 27' will be unseated and thus permit the flow of fluid from pipe 2' to pipe 3' around the strainer element 13'.

In a similar manner, when the fluid pressure in pipe 2' is reduced, if the pressure of the fluid in pipe 3' and acting, through passage 37, on the seated area of the check valve 36 should exceed the pressure acting in passage 30' on the upper face of said check valve sufficiently to overcome the pressure of spring 48, the check valve 36 will be unseated, permitting the flow of fluid from pipe 3' to pipe 2', without passing through the strainer element 13'.

It will be seen that in the embodiments of the invention illustrated in either Fig. 1 or Fig. 2, the valve mechanism and the strainer element are readily accessible for inspection and renewal by removing the cap sections 9 and 9'.

While two illustrative embodiments of the invention have been described in detail, it is not my intention to limit its scope to these embodiments or otherwise than by the terms of the appended claims.

Having now described my invention, what I claim as new and desire to secure by Letters Patent, is:

1. In a dirt collector, in combination, a casing section comprising a body section having a dirt separating chamber and a cover section having a fluid discharge passage, a strainer clamped between said body section and said cover section and bridging a communication through which fluid flows from said chamber to said discharge passage, a valve cage carried by said cover section adapted to engage the bridging portion of said strainer for preventing buckling of said strainer, and a valve contained in said cage normally closing a by-pass passage around said strainer and operable to permit flow of fluid through said by-pass passage when the fluid pressure in said communication intermediate said chamber and strainer exceeds the fluid pressure in said discharge passage by a predetermined amount, to permit flow of fluid to said outlet passage.

2. In a fluid straining device, a casing comprising a plurality of portions detachably secured together and including a central portion, a dirt collecting portion, and a cover portion, the central portion having passages formed therein adapted to have supply and discharge pipes connected thereto, the central portion having a dirt separating chamber formed therein, the supply passage communicating with said chamber, said chamber having a passage leading therefrom and communicating with a chamber in the dirt collecting casing portion, the casing central portion and cover portion cooperating to form a passage communicating with the dirt separating chamber and with the discharge passage, a strainer interposed in said passage and through which fluid flowing between the dirt separating chamber and the discharge passage flows, the casing central portion and cover portion also cooperating to form a passage communicating with the dirt separating chamber and with the discharge passage and by-passing the passage having the strainer interposed therein, the last-named passage having valve means associated therewith and controlling the flow of fluid therethrough, said valve means normally closing said passage and being operable in response to a predetermined difference in the pressure of the fluid in the dirt separating chamber and in the discharge passage to open said passage.

3. In a fluid straining device, a casing comprising a plurality of portions detachably secured together and including a central portion, a dirt collecting portion, and a cover portion, the central portion having passages formed therein adapted to have supply and discharge pipes connected thereto, the central portion having a dirt separating chamber formed therein, the supply passage communicating with said chamber, said chamber having a passage leading therefrom and communicating with a chamber in the dirt collecting casing portion, the casing central portion and cover portion cooperating to form a passage communicating with the dirt separating chamber and with the discharge passage, a strainer interposed in said passage and through which fluid flowing between the dirt separating chamber and the discharge passage flows, the casing central portion and cover portion also cooperating to form a passage communicating with the dirt separating chamber and with the discharge passage and by-passing the passage having the strainer interposed therein, the last-named passage having valve means associated therewith and controlling the flow of fluid therethrough, said valve means normally closing said passage and being operable in response to a predetermined difference in the pressure of the fluid in the dirt separating chamber and in the discharge passage to open said passage, the valve means and the strainer being accessible on removal of the casing cover portion.

4. In a fluid straining device, a casing comprising a plurality of portions detachably secured together and including a central portion, a dirt collecting portion, and a cover portion, the central portion having passages formed therein adapted to have supply and discharge pipes connected thereto, the casing central portion having a substantially conical dirt separating chamber formed therein having its axis disposed substantially vertically and having its portions of smaller diameter located vertically below the portions of larger diameter, and having a passage leading from the lower end thereof, a dirt collecting casing portion having a chamber formed therein and communicating with the passage leading from the lower end of the dirt separating chamber, the supply passage communicating with the dirt separating chamber at a point adjacent the upper wall thereof, the casing central portion having a passage formed therein and communicating with the dirt separating chamber at a point located below the top wall of said chamber and adjacent the axis thereof, the casing central portion and the cover portion cooperating to form a passage communicating with said last named passage and with the discharge passage, a strainer interposed in said passage and through which fluid flowing between the dirt separating chamber and the discharge passage flows, the casing cover portion and central portion also cooperating to form a passage communicating with the dirt separating chamber and with the discharge passage and by-passing the passage having the strainer interposed therein, the last named passage having valve means associated therewith and controlling the flow of fluid therethrough, said valve means normally closing said passage and being operable in response to a predetermined difference in the pressure of the fluid in the dirt separating chamber and in the discharge passage to open said passage.

5. In a dirt collector, in combination, a casing having a communication, including a dirt separating chamber, through which fluid is adapted to flow in either direction, a strainer interposed in said communication adjacent said chamber, a passage communicating with the dirt separating chamber and with said communication and by-passing the strainer, a valve normally closing said by-pass passage and operable to permit fluid to flow through said by-pass passage when the fluid pressure in said communication intermediate said chamber and strainer exceeds the fluid pressure in said communication at the opposite side of said strainer by a predetermined amount, another passage communicating with the dirt separating chamber and with said comunication and by-passing the strainer, and a check valve normally closing said other by-pass passage and operable to permit fluid to flow through said by-pass passage when the fluid pressure in the communication at said opposite side of said strainer exceeds the fluid pressure in said communication intermediate said chamber and strainer by a predetermined amount.

6. In a dirt collector, in combination, a casing having a communication, including a dirt separating chamber, through which fluid is adapted to flow in either direction, a strainer interposed in said communication adjacent said chamber, a passage communicating with the dirt separating chamber and with said communication and by-passing the strainer, a valve normally closing said by-pass passage and operable to permit fluid to flow through said by-pass passage when the fluid pressure in said communication intermediate said chamber and strainer exceeds the fluid pressure in said communication at the opposite side of said strainer by a predetermined amount, another passage communicating with the dirt separating chamber and with said communication and by-passing the strainer, and a check valve in said other by-pass passage for preventing flow of fluid through said passage from said communication intermediate said chamber and strainer to said communication at the opposite side of said strainer.

7. In a strainer device, in combination, a casing having supply and discharge passages formed therein and having a dirt separating chamber having an outlet passage formed therein, the supply passage communicating with said dirt separating chamber, an air strainer disposed in a passage communicating with said outlet passage and with said discharge passage, a passage leading from said outlet passage to said discharge passage and by-passing said air strainer, and valve means subject to the opposing pressures of the fluid in the outlet passage of the dirt separating chamber and in the said discharge passage and normally closing said by-pass passage and operative on a predetermined difference in said pressures to open communication through said passage.

8. In an air cleaner, a casing comprising a plurality of sections detachably secured together, one of said sections having a cavity formed therein, another of said sections forming a closure for said cavity and cooperating therewith to form a chamber, said casing sections having opposing stop means associated therewith and extending into said chamber, said stop means being spaced apart a given distance when said casing sections are secured together, the casing sections cooperating to form passages leading to and from the said chamber, an air straining unit positioned in said chamber and comprising spaced perforated members, a quantity of air straining material positioned between said members, and securing means extending between said members and operative to limit movement of the said members away from each other beyond a distance somewhat greater than the distance which said stop means are spaced apart, and being operative to permit said members to move towards each other, said members being yieldingly urged apart by the inherent resiliency of the air straining material, said perforated members being engaged by the stop means associated with the said casing sections when in position in said chamber and being maintained thereby in closer spaced relationship than that determined by the securing means associated therewith.

CLYDE C. FARMER.